United States Patent
Kang

(10) Patent No.: US 12,500,036 B2
(45) Date of Patent: Dec. 16, 2025

(54) MULTILAYER ELECTRONIC COMPONENT INCLUDING SIDE MARGIN PORTION

(71) Applicant: SAMSUNG ELECTRO-MECHANICS CO., LTD., Suwon-si (KR)

(72) Inventor: Sung Yong Kang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 121 days.

(21) Appl. No.: 18/387,659

(22) Filed: Nov. 7, 2023

(65) Prior Publication Data

US 2024/0212934 A1 Jun. 27, 2024

(30) Foreign Application Priority Data

Dec. 21, 2022 (KR) .................. 10-2022-0180177

(51) Int. Cl.
*H01G 4/30* (2006.01)
*C04B 35/468* (2006.01)
(Continued)

(52) U.S. Cl.
CPC ....... *H01G 4/1227* (2013.01); *C04B 35/4682* (2013.01); *H01G 4/224* (2013.01); *H01G 4/30* (2013.01)

(58) Field of Classification Search
CPC ........... H01G 4/224; H01G 4/23; H01G 4/30; H01G 4/1227; C04B 35/4682
See application file for complete search history.

(56) References Cited

U.S. PATENT DOCUMENTS

2013/0114182 A1 5/2013 Suh et al.
2014/0301013 A1* 10/2014 Kim .................. H01G 4/01
29/25.03
(Continued)

FOREIGN PATENT DOCUMENTS

JP 2017-011172 A 1/2017
JP 2017-28013 A 2/2017
(Continued)

OTHER PUBLICATIONS

Extended European Search Report issued Jun. 11, 2024 for European Patent Application No. 23209572.9.

*Primary Examiner* — David M Sinclair
(74) *Attorney, Agent, or Firm* — Morgan Lewis & Bockius LLP

(57) ABSTRACT

A multilayer electronic component includes a body including a capacitance forming portion including a dielectric layer and internal electrodes, and first to sixth surfaces; external electrodes disposed on the third and fourth surfaces of the body, respectively; and side margin portions disposed on the fifth and sixth surfaces of the body, respectively, wherein a Ba/Ti molar ratio of the side margin portion satisfies greater than 1.025 and less than 1.035, and is higher than a Ba/Ti molar ratio of the capacitance forming portion, wherein the number of moles of Mg based on 100 moles of Ti included in the side margin portion is greater than 1.0 mole and less than 2.0 moles, and wherein the number of moles of Sn based on 100 moles of Ti included in the side margin portion is 0.01 moles or more and less than 5.0 moles.

14 Claims, 11 Drawing Sheets

(51) Int. Cl.
  *H01G 4/12* (2006.01)
  *H01G 4/224* (2006.01)

(56) References Cited

U.S. PATENT DOCUMENTS

| | | | |
|---|---|---|---|
| 2015/0340155 A1* | 11/2015 | Fukunaga | H01G 4/30 |
| | | | 361/301.4 |
| 2015/0340156 A1* | 11/2015 | Masunari | H01G 4/1227 |
| | | | 361/301.4 |
| 2016/0196918 A1* | 7/2016 | Hong | H01G 4/232 |
| | | | 361/301.4 |
| 2017/0018363 A1 | 1/2017 | Tanaka et al. | |
| 2020/0105468 A1 | 4/2020 | Hashimoto et al. | |
| 2021/0074479 A1 | 3/2021 | Lee et al. | |
| 2022/0102076 A1 | 3/2022 | Isota et al. | |
| 2022/0139625 A1 | 5/2022 | Lee et al. | |
| 2022/0139632 A1 | 5/2022 | Kim et al. | |
| 2022/0148806 A1* | 5/2022 | Lee | H01G 4/224 |
| 2022/0208455 A1 | 6/2022 | Nam et al. | |
| 2022/0270824 A1 | 8/2022 | An et al. | |
| 2022/0319775 A1 | 10/2022 | Kato | |

FOREIGN PATENT DOCUMENTS

| | | | |
|---|---|---|---|
| JP | 6627916 B2 | | 1/2020 |
| KR | 20210030755 A | * | 3/2021 |

* cited by examiner

MULTILAYER ELECTRONIC COMPONENT INCLUDING SIDE MARGIN PORTION

CROSS-REFERENCE TO RELATED APPLICATION(S)

The present application claims the benefit of priority to Korean Patent Application No. 10-2022-0180177 filed on Dec. 21, 2022 in the Korean Intellectual Properties Office, the disclosure of which is incorporated herein by reference in its entirety.

1. TECHNICAL FIELD

The present disclosure relates to a multilayer electronic component.

2. BACKGROUND

A multilayer electronic component (MLCC), a multilayer electronic component, may be a chip condenser mounted on a printed circuit board of various electronic products such as imaging devices including a liquid crystal display (LCD) and a plasma display panel (PDP), a computer, a smartphone, and a mobile phone and charging or discharging electricity.

Such a multilayer ceramic capacitor may be used as a component of various electronic devices as a multilayer ceramic capacitor, may have a small size and high capacitance and may be easily mounted. As various electronic devices such as computers and mobile devices have been miniaturized and implemented with high-output, demand for miniaturization and high capacitance multilayer ceramic capacitors has increased.

Meanwhile, to implement miniaturization and high capacitance of a multilayer ceramic capacitors, maximization of an effective area of an electrode (increasing the effective volume fraction required for capacitance implementation) may be required. To realize a small-sized and high-capacitance multilayer ceramic capacitor as described above, when manufacturing a multilayer ceramic capacitor, an internal electrode may be exposed in a width direction of a body, thereby maximizing the area of the internal electrode in width direction through a design without margins, after manufacturing the body, before firing, a ceramic green sheet for a side margin portion may be separately attached to an exposed surface of an electrode in the width direction of the body and sintering may be performed.

Capacitance per unit volume of the capacitor may be improved by forming the side margin portion by separately attaching ceramic green sheets for the side margin portion, but due to permeation of external moisture or permeation of plating solution during the plating process through a boundary surface between the body and the side margin a lifespan of a chip may be reduced, or defects may occur. Accordingly, these issues may need to be addressed.

More specifically, in the process of forming the side margin portion, many pores may be created on the boundary surface on which the body and the side margin portion are contact in contact with each other, and reliability may be lowered, and electric field concentration may occur due to the pores, and accordingly, a breakdown voltage (BDV) may be lowered. Also, as a boundary surface bonding portion is formed at the boundary between the body and the side margin portion, a decrease in bonding strength and a decrease in sintering density due to the pores may cause a decrease in moisture resistance reliability. Also, as a thickness is reduced, electric field concentration may occur in the dielectric layer, or the chip may become vulnerable to high temperature and high pressure.

To prevent this, it is necessary to design an appropriate composition to satisfy reliability while ensuring a high effective volume. More specifically, to improve chip reliability, it may be important to ensure withstand voltage properties by reducing a size of dielectric grain of the side margin portion and strengthening grain boundaries, and to prevent moisture permeation through pores, it may be necessary to secure density of the side margin portion.

SUMMARY

An example embodiment of the present disclosure is to provide a multilayer electronic component having improved moisture resistance reliability.

An example embodiment of the present disclosure is to provide a multilayer electronic component which may endure high temperature and high pressure.

According to an example embodiment of the present disclosure, a multilayer electronic component includes a body including a capacitance forming portion including a dielectric layer and internal electrodes alternately disposed with the dielectric layer in a first direction, and first and second surfaces opposing each other in the first direction, third and fourth surfaces connected to the first and second surfaces and opposing each other in a second direction, and fifth and sixth surfaces connected to the first to fourth surfaces and opposing each other in a third direction; external electrodes disposed on the third and fourth surfaces of the body, respectively; and side margin portions disposed on the fifth and sixth surfaces of the body, respectively, wherein a Ba/Ti molar ratio of the side margin portion satisfies greater than 1.025 and less than 1.035, and is higher than a Ba/Ti molar ratio of the capacitance forming portion, wherein the number of moles of Mg based on 100 moles of Ti included in the side margin portion is greater than 1.0 moles and less than 2.0 moles, and wherein the number of moles of Sn based on 100 moles of Ti included in the side margin portion is 0.01 mole or more and less than 5.0 mole.

BRIEF DESCRIPTION OF DRAWINGS

The above and other aspects, features, and advantages of the present disclosure will be more clearly understood from the following detailed description, taken in combination with the accompanying drawings, in which:

FIGS. 9A to 8C are HALT graphs of test examples;

DETAILED DESCRIPTION

Figure 1:
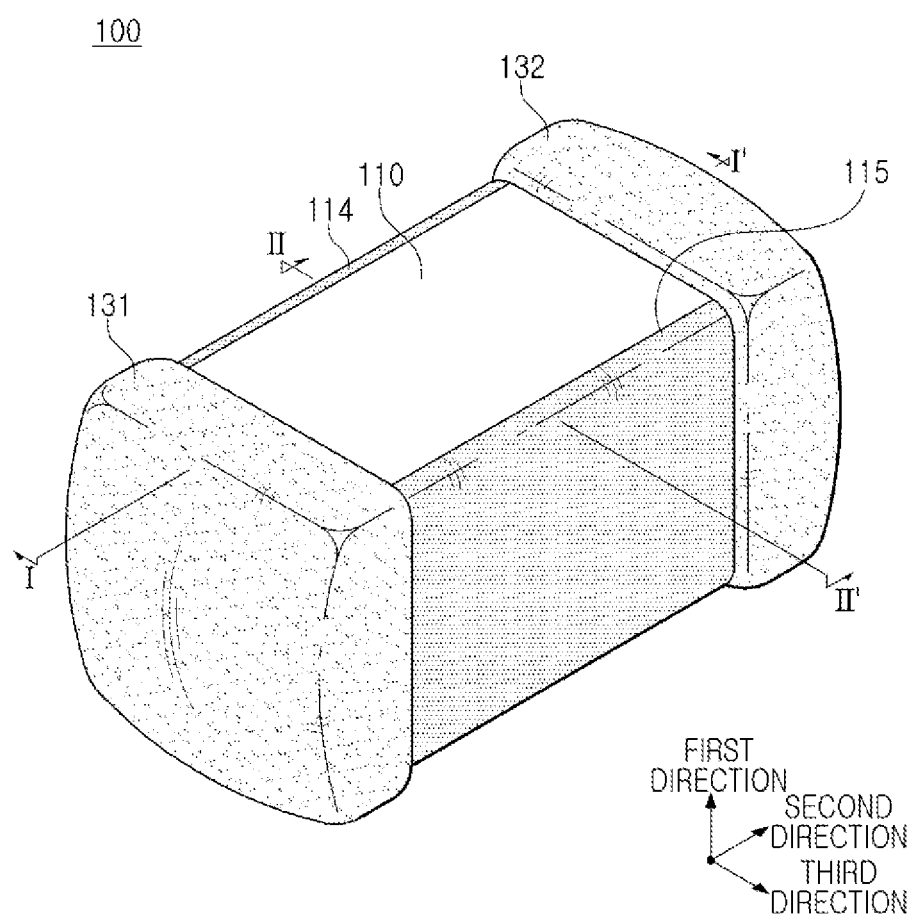
FIG. 1 is a perspective diagram illustrating a multilayer electronic component according to an example embodiment of the present disclosure.

Hereinafter, embodiments of the present disclosure will be described as below with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application.

In the drawings, same elements will be indicated by same reference numerals. Also, redundant descriptions and detailed descriptions of known functions and elements which may unnecessarily make the gist of the present disclosure obscure will not be provided. In the accompanying drawings, some elements may be exaggerated, omitted or briefly illustrated, and the sizes of the elements do not necessarily reflect the actual sizes of these elements. The terms, "include," "comprise," "is configured to," or the like of the description are used to indicate the presence of features, numbers, steps, operations, elements, portions or combination thereof, and do not exclude the possibilities of combination or addition of one or more features, numbers, steps, operations, elements, portions or combination thereof.

In the drawings, a first direction may be defined as a lamination direction or a thickness T direction, a second direction may be defined as a length L direction, and a third direction may be defined as a width W direction.

Multilayer Electronic Component

FIG. 1 is a perspective diagram illustrating a multilayer electronic component according to an example embodiment.

Figure 2:
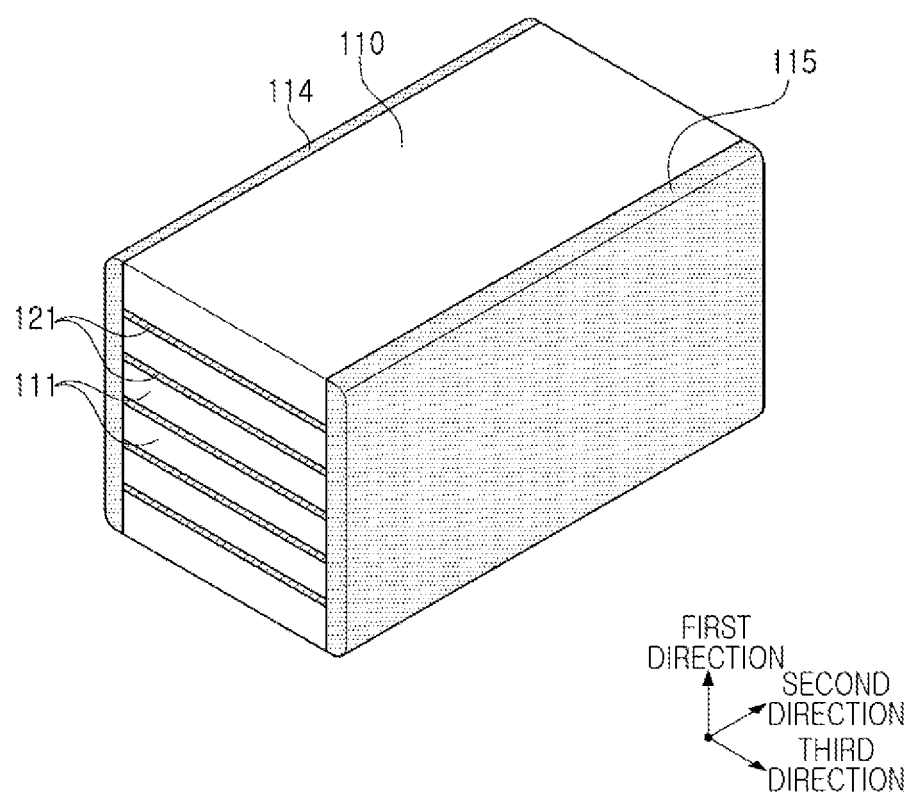
FIG. 2 is a perspective diagram illustrating a multilayer electronic component in FIG. 1 without external electrodes.

FIG. 2 is a perspective diagram illustrating a multilayer electronic component in FIG. 1 without external electrodes.

Figure 3:
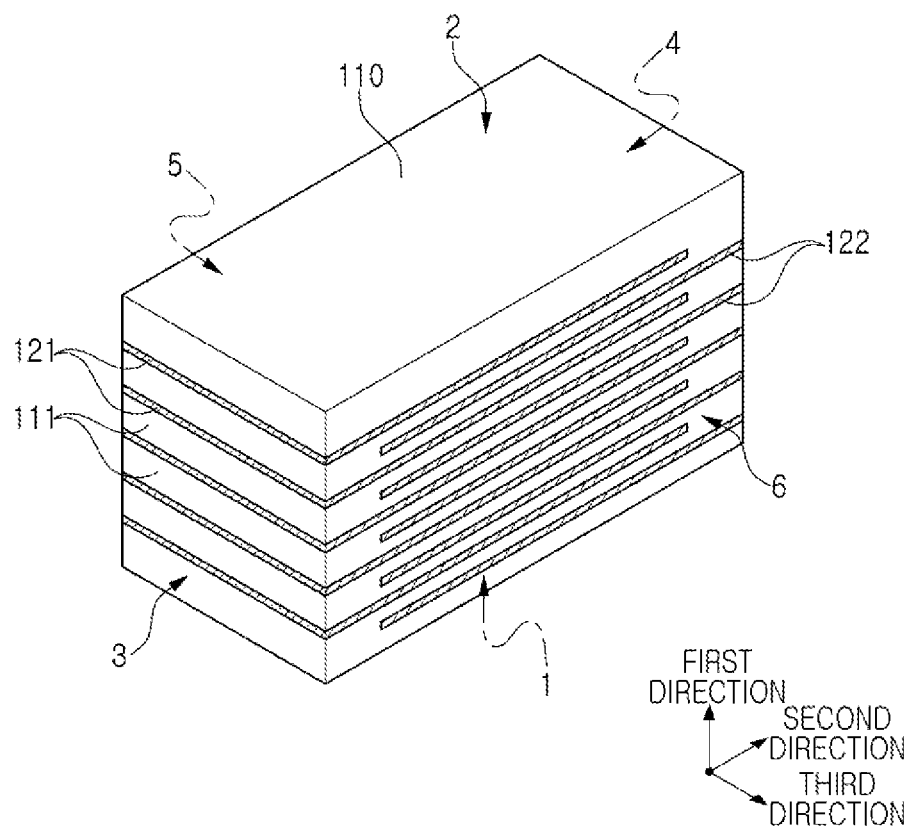
FIG. 3 is a perspective diagram illustrating a multilayer electronic component in FIG. 1 without external electrodes and a side margin portion.

FIG. 3 is a perspective diagram illustrating a multilayer electronic component in FIG. 1 without external electrodes and a side margin portion.

Figure 4:
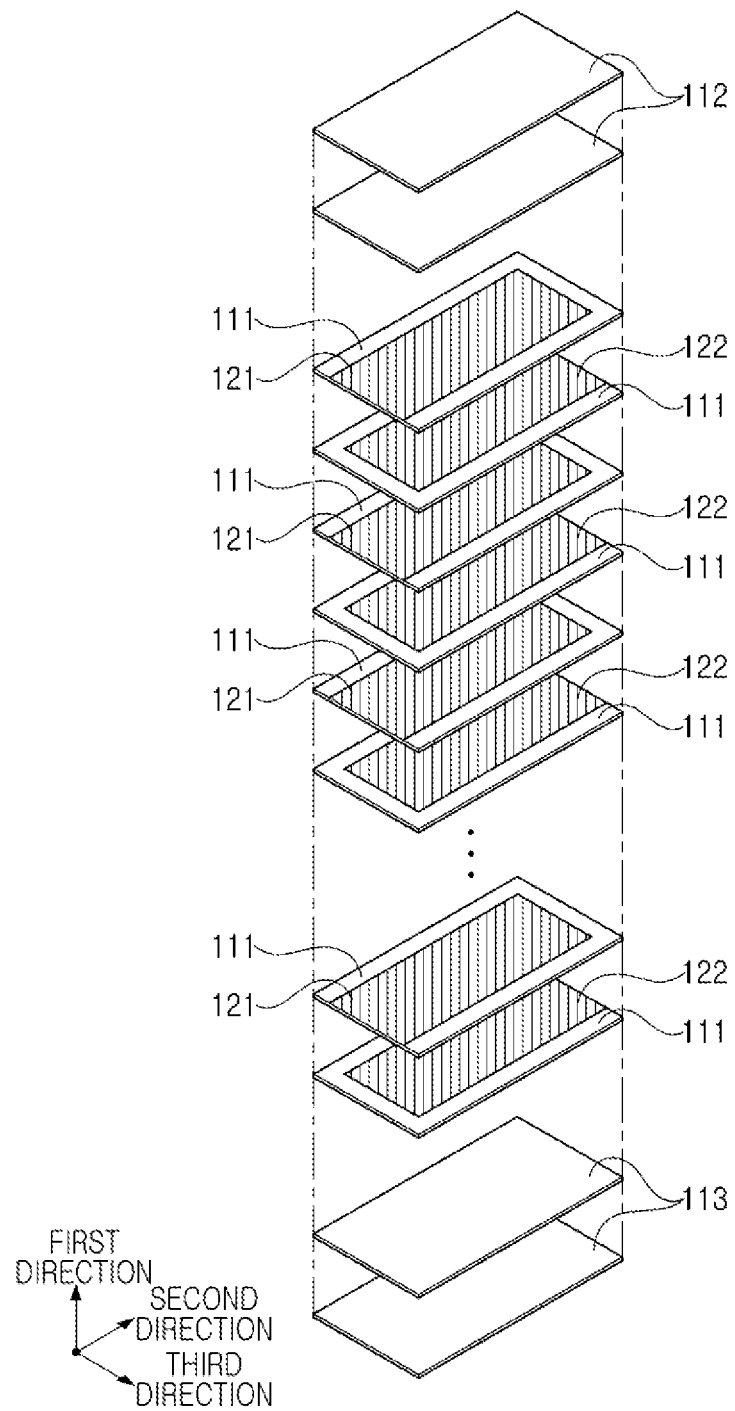
FIG. 4 is an exploded perspective diagram illustrating a laminate structure of internal electrodes according to an example embodiment of the present disclosure.

FIG. 4 is an exploded perspective diagram illustrating a laminate structure of internal electrodes according to an example embodiment.

Figure 5:
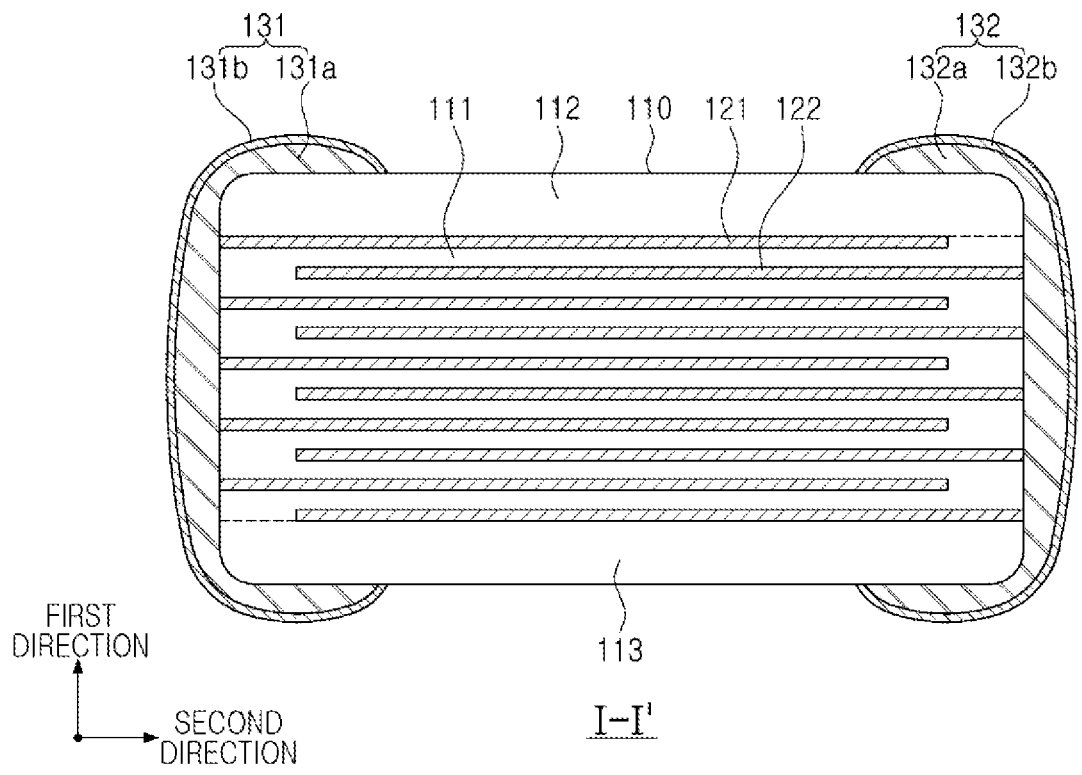
FIG. 5 is a cross-sectional diagram taken along line I-I' in FIG. 1.

FIG. 5 is a cross-sectional diagram taken along line I-I' in FIG. 1.

Figure 6:
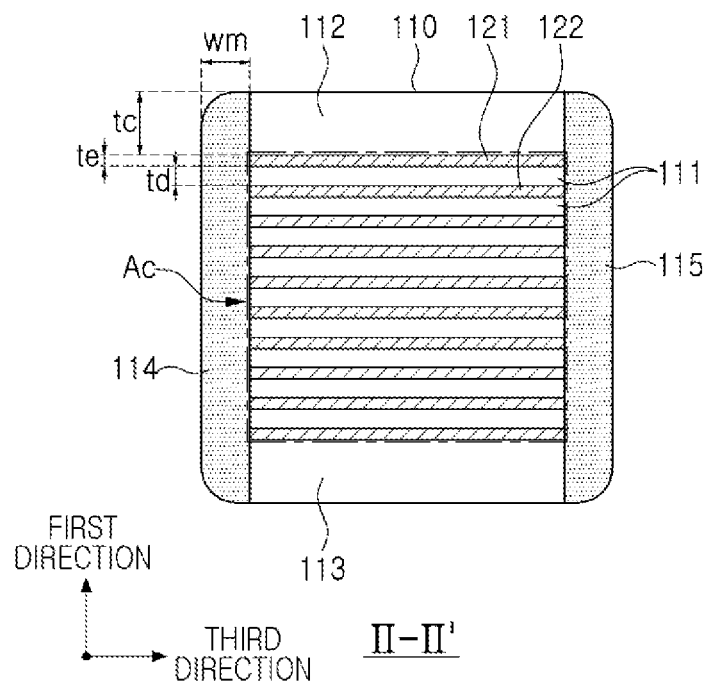
FIG. 6 is a cross-sectional diagram taken along line II-II' in FIG. 1.

FIG. 6 is a cross-sectional diagram taken along line II-II' in FIG. 1.

Hereinafter, a multilayer electronic component according to some example embodiments will be described in greater detail with reference to FIGS. 1 to 6. A multilayer ceramic capacitor will be described as an example of a multilayer electronic component, but the example embodiment may also be applied to various electronic products using a dielectric composition, such as an inductor, a piezoelectric element, a varistor, or a thermistor.

A multilayer electronic component 100 may include a body 110 including a capacitance forming portion Ac comprising a dielectric layer 111 and internal electrodes 121 and 122 alternately disposed with the dielectric layer 111 in a first direction, and first and second surfaces 1 and 2 opposing each other in the first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3, and 4 and opposing each other in a third direction; external electrodes 131 and 132 disposed on the third and fourth surfaces 3 and 4, respectively, and side margin portions 114 and 115 disposed on the fifth and sixth surfaces 5 and 6, respectively, a Ba/Ti molar ratio of the side margin portions 114 and 115 may satisfy greater than 1.025 and less than 1.035 and may higher than the Ba/Ti molar ratio of the capacitance forming portion Ac, the number of moles of Mg based on 100 moles of Ti included in the side margin portions 114 and 115 may be greater than 1.0 mole and less than 2.0 moles, and the number of moles of Sn based on 100 moles of Ti included in the side margin portions 114 and 115 may be greater than or equal to 0.01 moles and less than 5.0 moles.

In the body 110, the dielectric layers 111 and internal electrodes 121 and 122 may be alternately laminated.

More specifically, the body 110 may include a capacitance forming portion Ac disposed in the body 110 and forming capacitance including first internal electrodes 121 and second internal electrodes 122 alternately disposed to face each other with the dielectric layers 111 interposed therebetween.

The shape of the body 110 may not be limited to any particular shape, but as illustrated, the body 110 may have a hexahedral shape or a shape similar to a hexahedral shape. Due to reduction of ceramic powder included in the body 110 during a firing process, the body 110 may not have an exact hexahedral shape formed by linear lines but may have a substantially hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2 and the third and fourth surfaces 3 and 4 and opposing each other in the third direction.

The plurality of dielectric layers 111 forming the body 110 may be in a fired state, and a boundary between the adjacent dielectric layers 111 may be integrated with each other such that the boundary may not be distinct without using a scanning electron microscope (SEM).

A raw material for forming the dielectric layer 111 is not limited to any particular example as long as sufficient capacitance may be obtained. For example, a barium titanate-based material, a lead composite perovskite-based material, or a strontium titanate-based material may be used. The barium titanate material may include $BaTiO_3$ ceramic powder, and an example of the ceramic powder may include $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) or $Ba(Ti_{1-y}Zr_y)O_3$ (0<y<1) in which Ca (calcium) and Zr (zirconium) are partially solid-solute.

Also, various ceramic additives, organic solvents, binders, dispersants, or the like, may be added to a raw material for forming the dielectric layer 111 in the example embodiment to powder such as barium titanate ($BaTiO_3$).

The thickness td of the dielectric layer 111 may not be limited to any particular example.

However, to easily implement a reduced size and high capacitance of the multilayer electronic component 100, the thickness td of at least one of the dielectric layers 111 may be 3.0 μm or less. To easily obtain miniaturization and high capacitance of the multilayer electronic component, the thickness of at least one of the dielectric layers 111 may be 1.0 μm or less, preferably 0.6 μm or less, and more preferably 0.4 μm or less.

Here, the thickness td of at least one of the dielectric layers 111 may refer to an average thickness of the dielectric layer 111 disposed between the first and second internal electrodes 121 and 122.

The thickness td of at least one of the dielectric layers 111 may refer to the size of the dielectric layer 111 in the first direction. Also, the thickness td of at least one of the dielectric layers 111 may refer to the average thickness td of the dielectric layer 111 and may refer to the average size of the dielectric layer 111 in the first direction.

The average thickness of at least one of the dielectric layers 111 may be measured by scanning a cross-section of the body 110 in the first and second directions using a scanning electron microscope (SEM) with a magnification of 10,000. More specifically, an average value may be measured from the thicknesses of the dielectric layer 111 at 30 points spaced apart by an equal distance in the first direction in the scanned image. The 30 points at equal distances may be designated in the active portion Ac. Also, when the average value is measured by extending the measurement of the average value to ten dielectric layers 111, the average thickness of the dielectric layer 111 in the first direction may be further generalized.

The internal electrodes 121 and 122 may be alternately laminated with the dielectric layers 111.

The internal electrodes 121 and 122 may include a first internal electrode 121 and a second internal electrode 122, the first and second internal electrodes 121 and 122 may be alternately disposed to face each other with the dielectric layer 111 included in the body 110 interposed therebetween, and may be exposed to the third and fourth surfaces 3 and 4 of the body 110, respectively.

More specifically, the first internal electrode 121 may be spaced apart from the fourth surface 4 and may be exposed through the third surface 3, and the second internal electrode 122 may be spaced apart from the third surface 3 and may be exposed through the fourth surface 4. The first external electrode 131 may be disposed on the third surface 3 of the body 110 and may be connected to the first internal electrode 121, and the second external electrode 132 may be disposed on the fourth surface 4 of the body 110 and may be connected to the second internal electrode 122.

That is, the first internal electrode 121 may be connected to the first external electrode 131 without being connected to the second external electrode 132, and the second internal electrode 122 may be connected to the second external electrode 132 without being connected to the first external electrode 131. In this case, the first and second internal electrodes 121 and 122 may be electrically separated from each other by the dielectric layer 111 disposed therebetween.

The body 110 may be formed by alternately laminating ceramic green sheets on which the first internal electrodes 121 are printed and ceramic green sheets on which the second internal electrodes 122 are printed, and firing the sheets.

The material for forming the internal electrodes 121 and 122 is not limited to any particular example, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

Also, the internal electrodes 121 and 122 may be formed by printing conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof on a ceramic green sheet. A screen-printing method or a gravure printing method may be used as a method of printing the conductive paste for internal electrodes, but an example embodiment thereof is not limited thereto.

The thickness te of the internal electrodes 121 and 122 may not need to be limited to any particular example.

However, to easily implement miniaturization and high capacitance of the multilayer electronic component 100, the thickness te of the internal electrodes 121 and 122 may be 0.6 µm or less, more preferably 0.4 µm or less.

Here, the thickness te of the internal electrodes 121 and 122 may refer to the size of the internal electrodes 121 and 122 in the first direction. Also, the thickness te of the internal electrodes 121 and 122 may refer to the average thickness te of the internal electrodes 121 and 122, and may refer to the average size of the internal electrodes 121 and 122 in the first direction.

The average thickness of the internal electrodes 121 and 122 may be measured by scanning a cross-section of the body 110 in the first direction using a scanning electron microscope (SEM) with a magnification of 10,000. More specifically, an average value may be measured from the thicknesses of the internal electrodes 121 and 122 at 30 points spaced apart by an equal distance in the second direction in the scanned image. The 30 points at equal distances may be designated in the active portion Ac. Also, when the average value is measured by extending the measurement of the average value to ten internal electrodes 121 and 122, the average thickness of the internal electrodes 121 and 122 may be further generalized.

The body 110 may include cover portions 112 and 113 disposed on both end-surfaces of the capacitance forming portion Ac in the first direction.

More specifically, the body 110 may include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by laminating a single dielectric layer 111 or two or more dielectric layers 111 on the upper and lower surfaces of the capacitance forming portion Ac in a first direction, respectively, and may basically prevent damages to the internal electrodes 121 and 122 due to physical or chemical stress.

The upper cover portion 112 and the lower cover portion 113 may not include the internal electrodes 121 and 122 and may include the same material as that of the dielectric layer 111. That is, the upper cover portion 112 and the lower cover portion 113 may include a ceramic material, for example, a barium titanate ($BaTiO_3$) ceramic material.

The thickness tc of the cover portion 112 and 113 may not need to be limited to any particular example.

However, to easily obtain miniaturization and high capacitance of multilayer electronic components, the thickness tc of the cover portions 112 and 113 may be 100 µm or less, preferably 30 µm or less. More preferably, the thickness may be 20 µm or less.

Here, the thickness tc of the cover portion 112 or 113 may refer to the size of the cover portion 112 or 113 in the first direction. Also, the thickness tc of the cover portions 112 and 113 may refer to the average thickness tc of the cover portions 112 and 113, and may refer to the average size of the cover portions 112 and 113 in the first direction.

The average thickness of the cover portions 112 and 113 may be measured by scanning a cross-section of the body 110 in the first and second directions using a scanning electron microscope (SEM) with a magnification of 10,000. More specifically, an average value may be measured from the thicknesses of the cover portion at 30 points spaced apart by an equal distance in the first direction in the scanned image.

First and second side margin portions 114 and 115 may be disposed on end-surfaces of the body 110 in the third direction.

More specifically, the side margin portions 114 and 115 may include a first side margin portion 114 disposed on the fifth surface 5 and a second side margin portion 115 disposed on the sixth surface 6 of the body 110.

As illustrated in FIG. 6, the side margin portions 114 and 115 may refer to a region between both end-surfaces of the first and second internal electrodes 121 and 122 in the third direction and the boundary surface of the body 110 with respect to the cross-section of the body 110 in the first and third directions.

The side margin portions 114 and 115 may basically prevent damages to the internal electrodes 121 and 122 due to physical or chemical stress.

The side margin portions 114 and 115 may be formed by a method including forming internal electrodes 121 and 122 on the ceramic green sheet by applying a conductive paste other than the region in which the side margin portions 114 and 115 are formed, cutting the laminated internal electrodes 121 and 122 to expose the fifth and sixth surfaces 5 and 6 of the body 110 to prevent a step difference caused by the internal electrodes 121 and 122, and laminating a single dielectric layer 111 or two or more dielectric layers 111 in a third direction on both end-surfaces of the capacitance forming portion Ac in the third direction.

The first side margin portion 114 and the second side margin portion 115 may not include the internal electrodes 121 and 122 and may include the same material as that of the dielectric layer 111. That is, the first side margin portion 114 and the second side margin portion 115 may include a ceramic material, for example, a barium titanate ($BaTiO_3$) ceramic material.

Meanwhile, the width wm of each of the first and second side margin portions 114 and 115 may not need to be limited to any particular example.

However, to easily obtain miniaturization and high capacitance of the multilayer electronic component 100, the width wm of each of the side margin portions 114 and 115 may be 100 μm or less, preferably 30 μm or less, and may be more preferably 20 μm or less in ultra-small products.

Here, the width wm of each of the side margin portions 114 and 115 may refer to the size of each of the side margin portions 114 and 115 in the third direction. Also, the width wm of each of the side margin portions 114 and 115 may refer to the average width wm of each of the side margin portions 114 and 115, and the average size of each of the side margin portions 114 and 115 in the third direction.

The average size of each of the side margin portion 114 and 115 in the third direction may be measured by scanning a cross-section of the body 110 in the first and third directions using a scanning electron microscope (SEM) with a magnification of 10,000. More specifically, the average size may be an average value measured from the size in the third direction at 30 points spaced apart from each other by an equal distance in the first direction in the scanned image of one of the side margin portions. Also, when the average value is measured by extending the measurement of the average value to the second side margin portion 115, the average thickness of the side margin portions 114 and 115 in the first direction may be further generalized.

In an example embodiment, the ceramic electronic component 100 may have two external electrodes 131 and 132, but the number or shape of the external electrodes 131 and 132 may be varied depending on the forms of the internal electrode 121 and 122 or other purposes.

The first and second external electrodes 131 and 132 may be disposed on the body 110 and may be connected to the internal electrodes 121 and 122.

More specifically, the first and second external electrodes 131 and 132 may be disposed on the third and fourth surfaces 3 and 4 of the body 110, respectively, and may connected to the first and second internal electrodes 121 and 122, respectively. That is, the first external electrode 131 may be disposed on the third surface 3 of the body and may be connected to the first internal electrode 121, and the second external electrode 132 may be disposed on the fourth surface 4 of the body and may be connected to the second internal electrode 122.

The external electrodes 131 and 132 may be formed of any material having electrical conductivity, such as metal, and a specific material may be determined in consideration of electrical properties and structural stability, and the external electrodes 131 and 132 may have a multilayer structure.

For example, the external electrodes 131 and 132 may include electrode layers 131a and 132a disposed on the body 110 and plating layers 131b and 132b disposed on the electrode layers 131a and 132a.

For a more specific example of the electrode layers 131a and 132a, the electrode layers 131a and 132a may be sintered electrodes including a first conductive metal and glass, or a second conductive metal and resin.

Also, the electrode layers 131a and 132a may include a plastic electrode and a resin-based electrode are formed in order on the body.

Also, the electrode layers 131a and 132a may be formed by transferring a sheet including a conductive metal onto a body or by transferring a sheet including a conductive metal onto a fired electrode.

A conductive metal used in the electrode layers 131a and 132a is not limited to any particular example as long as the material may be electrically connected to the internal electrodes 121 and 122 to form capacitance. For example, the conductive metal may include one or more selected from the group consisting of nickel (Ni), copper (Cu), palladium (Pd), silver (Ag), gold (Au), platinum (Pt), tin (Sn), tungsten (W), titanium (Ti) and alloys thereof, but an example embodiment thereof is not limited thereto. The electrode layers 131a and 132a may be formed by applying a conductive paste prepared by adding glass frit to the conductive metal powder and firing the paste.

The first and second plating layers 131b and 132b may be disposed on the first and second electrode layers 131a and 132a, respectively, and may improve mounting properties.

The type of the plating layers 131b and 132b is not limited to any particular example, and may be single-layer plating layers 131b and 132b including at least one of nickel (Ni), tin (Sn), palladium (Pd), and alloys thereof, or may include a plurality of layers.

For a more specific example of the plating layers 131b and 132b, the plating layers 131b and 132b may include Ni plating layers or Sn plating layers, and Ni plating layers and Sn plating layers may be formed in order on the electrode layers 131a and 132a, and a Sn plating layer, a Ni plating layer, and a Sn plating layer may be formed in order. Also, the plating layers 131b and 132b may include a plurality of Ni plating layers and/or a plurality of Sn plating layers.

In the description below, an example embodiment will be described in greater detail.

To implement miniaturization and high capacitance of a multilayer ceramic capacitors, maximization of an effective area of an electrode (increasing the effective volume fraction required for capacitance implementation) may be required. To realize a small-sized and high-capacitance multilayer ceramic capacitor as described above, when manufacturing a multilayer ceramic capacitor, an internal electrode may be exposed in a width direction of a body, thereby maximizing the area of the internal electrode in width direction through a design without margin, after manufacturing the body, before firing, a ceramic green sheet for a side margin portion may be separately attached to an exposed surface of an electrode in the width direction of the body and sintering may be performed.

Capacitance per unit volume of the capacitor may be improved by forming the side margin portion by separately attaching ceramic green sheets for the side margin portion, but due to permeation of external moisture or permeation of plating solution during the plating process through a boundary surface between the body and the side margin a lifespan of a chip may be reduced, or defects may occur. Accordingly, these issues may need to be addressed.

More specifically, in the process of forming the side margin portion, many pores may be created on the boundary surface on which the body and the side margin portion are in contact with each other, and reliability may be lowered, and electric field concentration may occur due to the pores, and accordingly, a breakdown voltage (BDV) may be lowered. Also, as a boundary surface bonding portion is formed at the boundary between the body and the side margin portion, a decrease in bonding strength and a decrease in sintering density due to the pores may cause a decrease in moisture resistance reliability. Also, as a thickness is reduced, electric field concentration may occur in the dielectric layer, or the chip may become vulnerable to high temperature and high pressure.

To prevent this, it is necessary to design an appropriate composition to satisfy reliability while ensuring a high effective volume. More specifically, to improve chip reliability, it may be important to ensure withstand voltage properties by reducing a size of dielectric grain of the side margin portion and strengthening grain boundaries, and to prevent moisture permeation through pores, it may be necessary to secure density of the side margin portion.

Accordingly, in an example embodiment, the Ba/Ti molar ratio of the side margin portions 114 and 115 may satisfy greater than 1.025 and less than 1.035, which is higher than the Ba/Ti molar ratio of the capacitance forming portion. The number of moles of magnesium (Mg) based on 100 moles of titanium (Ti) contained in the side margin portions 114 and 115 may be greater than 1.0 mole and less than 2.0 moles, and the number of moles of tin (Sn) based on 100 moles of titanium (Ti) included in the side margin portions 114 and 115 may be 0.01 moles or more and less than 5.0 moles.

A method of measuring the content of elements may be as below.

In the case of a non-destructive method, the components of the region to be measured may be analyzed using TEM-EDS. Among the cross-sections of the sintered multilayer electronic component, a thinned analysis sample may be prepared using a focused ion beam (FIB) device in the region to be measured. For example, a boundary surface portion of a central portion or a side margin portion of the capacitance forming portion Ac may be measured. Also, the damaged layer on the surface of the thinned sample may be removed using Ar ion milling, and mapping and quantitative analysis of each component may be performed in the image obtained using STEM-EDS. In this case, the quantitative analysis graph of each component may be obtained in a mass fraction (wt %) of each element, which may be represented in terms of a mole fraction (mol %), or may be represented by a ratio between the elements.

Also, in the case of a destructive method, the multilayer capacitor may be crushed and a portion to be measured may be selected, and components of the dielectric in the selected portion may be qualitatively and quantitatively analyzed using devices such as an inductively coupled plasma spectrometer (ICP-OES) and an inductively coupled plasma mass spectrometer (ICP-MS).

By controlling the Ba/Ti molar ratio of the side margin portion 114 and 115 to be higher than the Ba/Ti ratio of the capacitance forming portion Ac and to be more than 1.025 mole and less than 1.035, among the side margin portions 114 and 115, the size of dielectric grain included in the boundary surface portion, which is a region adjacent to the capacitance forming portion Ac, may be atomized.

In this case, more preferably, the Ba/Ti molar ratio of the side margin portion may be 1.028 or more and 1.032 or less.

By lowering the boundary surface portion porosity of the side margin portions 114 and 115 by controlling the Ba/Ti molar ratio of the side margin portions 114 and 115 to be more than 1.025 and less than 1.035, more preferably 1.028 or more and 1.032 or less, reliability may be improved.

When the Ba/Ti molar ratio of the side margin portions 114 and 115 is 1.025 or less, the dielectric capacitance properties in a high temperature/high pressure environment may be degraded, and when the Ba/Ti molar ratio of the side margin portions 114 and 115 is 1.035 or higher, moisture resistance reliability may deteriorate.

The Ba/Ti ratio of the capacitance forming portion Ac may be in a range in which capacitance may be formed. For example, the Ba/Ti ratio of the capacitance forming portion Ac may be less than 1.025, but an example embodiment thereof is not limited thereto.

More specifically describing the boundary surface portion, a region adjacent to the capacitance forming portion Ac in the first side margin portion 114 may be defined as a first boundary surface portion, and a region adjacent to the capacitance forming portion Ac in the second side margin portion 115 may be defined as a second boundary surface portion.

In the example embodiment the description of the boundary surface portion may include a description of the first boundary surface portion and the second boundary surface portion.

In this case, the boundary surface portion may refer to a region within 5.0 μm of the boundary surface bonding portion in which the body 110 and the side margin portions 114 and 115 are in contact with each other in the third direction toward the outer surface of the side margin portions 114 and 115.

For example, in the first side margin portion 114, a region within 5.0 μm from the boundary surface contacting the capacitance forming portion Ac in the third direction toward the outer surface of the first side margin portion 114 may be defined as a first boundary surface portion. In this case, a boundary surface on which the capacitance forming portion Ac and the first side margin portion 114 are in contact with each other may refer to ends of the internal electrodes 114 and 115 in the third direction.

Also, in the second side margin portion 115, a region within 5.0 µm of the boundary surface contacting the capacitance forming portion Ac in the third direction toward the outer surface of the second side margin portion 115 may be defined as a second boundary surface portion. In this case, a boundary surface on which the capacitance forming portion Ac and the second side margin portion 115 are in contact with each other may refer to ends of the internal electrodes 114 and 115 in the third direction.

In other words, the first and second boundary surface portions may refer to a region within 5.0 µm from the end of the internal electrodes 121 and 122 in the third direction to the outward in the second direction of the side margin portions 114 and 115 based on cross-sections in the first and third directions of the multilayer electronic component 100. More specifically, for example, based on cross-sections of the body 110 in the first and third directions, the region may refer to a region scanned through SEM of a region within 5 µm×5 µm with the boundary surface in contact with the capacitance forming portion in the side margin portions 114 and 115 in the center of the first direction as a central line.

The Ba/Ti molar ratio of the side margin portions 114 and 115 may satisfy more than 1.025 and less than 1.035, and by controlling the Ba/Ti molar ratio to be higher than the capacitance forming portion Ac, the average size of dielectric grains included in the boundary surface portion may be controlled to satisfy 160 nm or more and 180 nm or less.

Here, the average size of the dielectric grains may correspond to the average value of the minimum linear line size and the maximum linear line size passing through the central point of the dielectric grain, and the average size of the dielectric grains may be an average value of average sizes of the dielectric grains measured using the above method.

The boundary surface portion may be vulnerable to electric field concentration. In this case, by controlling the Ba/Ti molar ratio of the side margin portions 114 and 115 to be higher than the Ba/Ti molar ratio of the capacitance forming portion Ac, the average size of the dielectric grains included in the boundary surface portion may be smaller than the average size of the dielectric grains included in the capacitance forming portion Ac, such that an insulation breakdown defect due to electric field concentration may be addressed.

When the average size of the dielectric grains included in the boundary surface portion is less than 160 nm, density may be lowered and moisture resistance reliability may be degraded, and when the average size of the dielectric grains included in the boundary surface portion exceeds 180 nm, insulation breakdown may occur due to electric field concentration.

In this case, the standard deviation of the size of the dielectric grains included in the boundary surface portion may be 100 nm or less.

The standard deviation of the size of dielectric grains may be obtained by calculating the sum by squaring the deviation, which indicates the value obtained by subtracting the average size of dielectric grains from the measured value of the size of dielectric grains, and adding the entirety of values, and taking the square root of the variance, which indicates a value calculated by dividing the sum by the value obtained by subtracting 1 from the number of measured dielectric grains.

The standard deviation may indicate the degree to which the distribution of values is uniform and even, and the smaller the size, the more uniformly sized crystal grains.

The lower limit of the standard deviation for the size of the dielectric grain is not limited to any particular example, and it may be desirable that the dispersion is improved as the size is smaller, but it may be difficult to actually control the limit, such that the lower limit may be determined to be 50 nm.

When the standard deviation of the size of the dielectric grains exceeds 100 nm, the size deviation between the dielectric grains may increase and dielectric breakdown voltage may occur due to electric field concentration.

When the number of moles of magnesium (Mg) included in the side margin portion 114 and 115 is controlled to be more than 1.0 mole and less than 2.0 moles, more preferably 1.3 moles or more and 1.7 moles or less, based on 100 moles of titanium (Ti), a low-temperature sintering effect may appear on the dielectric grains of the boundary surface portion, thereby reducing porosity and improving density, and improving moisture resistance reliability.

In the example embodiment magnesium (Mg) may serve as a liquid phase sintering aid, and may suppress grain growth of dielectric grains, and more specifically, as magnesium (Mg) is disposed on grain boundaries of dielectric grains, sintering between grains may be prevented.

When the number of moles of magnesium (Mg) included in the side margin portion 114 and 115 is 1.0 mole or less, the sinter delay effect may be insufficient, and when the mole number of magnesium (Mg) is 2.0 moles or more, grain growth of dielectric grains may be suppressed excessively or sintering may not be performed.

In this case, the number of moles of magnesium (Mg) based on 100 moles of titanium (Ti) included in the side margin portion 114 and 115 may be higher than the number of moles of magnesium (Mg) based on 100 moles of titanium (Ti) included in the capacitance forming portion Ac.

By controlling the number of moles of magnesium (Mg) in the side margin portions 114 and 115 which may not significantly affect the dielectric capacitance, sintering density of the boundary surface portion may be improved, and dielectric capacitance of the capacitance forming portion Ac may not be lowered.

When the number of moles of tin (Sn) included in the side margin portion 114 and 115 is controlled to be 0.01 moles or more and less than 5.0 moles, preferably more than 1.0 mole and less than 5.0 moles, more preferably 2.5 moles or more and 3.5 moles or less, based on 100 moles of titanium (Ti), dielectric grain resistance of the boundary surface portion may be improved, such that the breakdown voltage properties may be improved.

When the number of moles of tin (Sn) based on 100 moles of titanium (Ti) included in the side margin portions 114 and 115 satisfies 0.01 moles or more and less than 5.0 moles, the dielectric grain resistance may be improved, insulation breakdown due to electric field concentration may be prevented, and high-temperature and high-voltage reliability may be improved.

Tin (Sn) included in the side margin portions 114 and 115 may improve high-temperature and high-pressure reliability even when added in a relatively small content, but more preferably, when controlled to be 2.5 moles or more and 3.5 moles or less, reliability of the multilayer electronic component may be improved.

When the number of moles of tin (Sn) included in the side margin portions 114 and 115 is 5.0 moles or more, high-temperature and high-pressure reliability may deteriorate or moisture resistance reliability or dielectric breakdown voltage may degrade.

In this case, the number of moles of tin (Sn) based on 100 moles of titanium (Ti) included in the side margin portion 114 and 115 may be higher than the number of moles of tin (Sn) per 100 moles of titanium (Ti) included in the capacitance forming portion Ac.

By controlling the number of moles of tin (Sn) in the side margin portions 114 and 115 which may not significantly affect dielectric capacitance, dielectric breakdown voltage may be improved through control of electric field concentration on the boundary surface portion, and the dielectric capacitance of the capacitance forming portion Ac may not be lowered.

The higher the Ba/Ti molar ratio of the dielectric, the higher the porosity may be. Here, the formed pore may be a path through which external moisture permeates, which may cause a degradation in moisture resistance reliability.

In this case, the porosity of the boundary surface portion may be less than 1.30%, the lower limit is not limited to any particular example, but may be greater than 0.01%. When the porosity of the boundary surface portion satisfies less than 1.30%, moisture resistance reliability may be improved.

When the porosity of the boundary surface portion is 1.30% or more, external moisture may easily permeate through the pores, such that moisture resistance reliability may be lowered.

The porosity of the boundary surface portion may be defined as (total area of pores in the measured region/total measured area)×100%, and may be calculated as below, but an example embodiment thereof is not limited thereto.

For example, based on cross-sections of the multilayer electronic component in the first and third directions, an image obtained by scanning a region of 5 μm×5 μm through SEM by disposing a boundary surface on which the end of the internal electrode and the side margin portion are in contact with each other in the central line. The conditions of the SEM measurement equipment may be an accelerating voltage of 2 kV, a sample distance (WD) of 3 mm, an aperture size of 30 μm, and a magnification of 12,000 times. In this case, in the region of 5 μm from the boundary surface of the internal electrode and the side margin portion, which is the boundary surface portion region, to the outer side of the side margin portion, a percentage value obtained by dividing the total area of pores present in the boundary surface portion by the area of the boundary surface portion may be calculated as the porosity of the boundary surface portion.

The size of the multilayer electronic component 100 is not limited to any particular example.

However, the effect of the example embodiment may be significant in the multilayer electronic component 100 having an ultra-small size, for example, in a size of 1005 (length×width: 1.0 mm×0.5 mm) or less, moisture resistance reliability, high temperature and high pressure properties may be excellent.

Although the example embodiments have been described in detail above, the example embodiment is not limited by the above-described embodiments and the accompanying drawings, but is limited by the appended claims. Therefore, various forms of substitution, modification, and change may be made by those skilled in the art within the scope of the technical spirit of the present disclosure described in the claims, which also falls within the scope of the present disclosure.

Hereinafter, the example embodiment will be described in greater detail through experimental examples, but the scope of the present disclosure is not limited to the experimental examples.

Test Example

Table 1 below lists the Ba/Ti molar ratio of the side margin portion, the number of moles of Mg based on 100 moles of Ti in the side margin portion, the number of moles of Sn based on 100 moles of Ti in the side margin portion, the average size of the dielectric grain (preceding number) and standard deviation (subsequent±number), and porosity of the boundary surface portion of the side margin portion of test example 1 to test example 9.

The size of the sample chip was a size of 1005 (length×width, 1.0 mm×0.5 mm). As for the element measurement region, based on cross-sections in the first and third directions at the ½ point in the second direction of the multilayer electronic component, by obtaining an image by scanning a region of 5 μm×5 μm through SEM with the boundary surface on which the end of the internal electrode in the third direction and the second side margin portion are in contact with each other as the central line, the average size and size standard deviation and porosity of dielectric grains included in a region of 5 μm from the boundary surface of the internal electrode, which is the boundary surface portion region, and the side margin portion to the outer side of the side margin portion were measured.

The conditions of the SEM measurement equipment were an accelerating voltage of 2 kV, a WD of 3 mm, an aperture size of 30 μm, and a magnification of 12,000.

FIGS. 7A to 9C are graphs of highly accelerated life test (HALT) of test example 1 to test example 9, and FIGS. 10 to 12 are moisture resistance reliability graphs of test example 1 to test example 9.

Figure 7A:
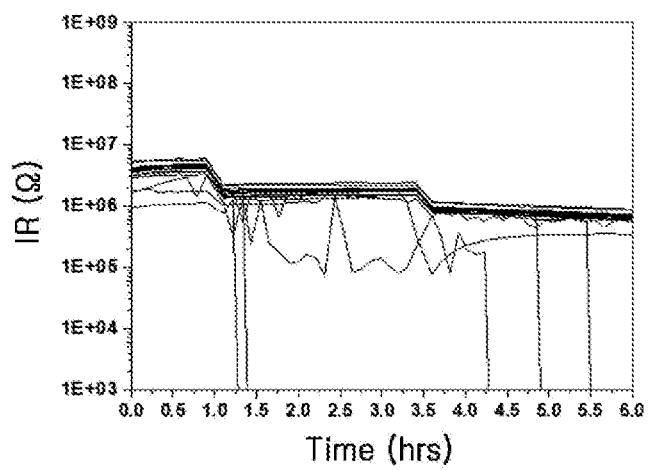
FIGS. 7A to 7C are HALT graphs of test examples.
Figure 7B:
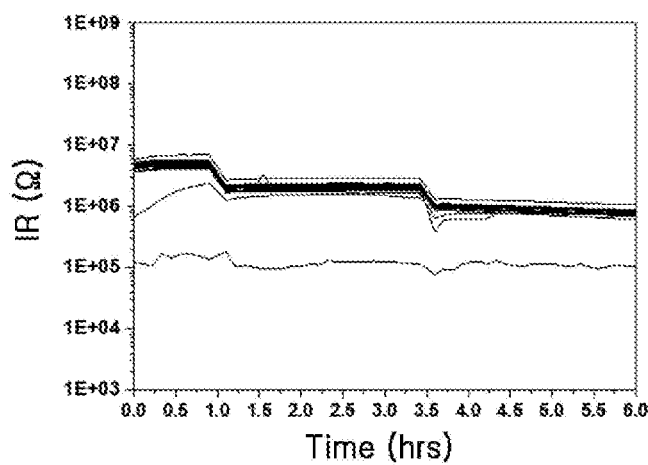
Figure 7C:
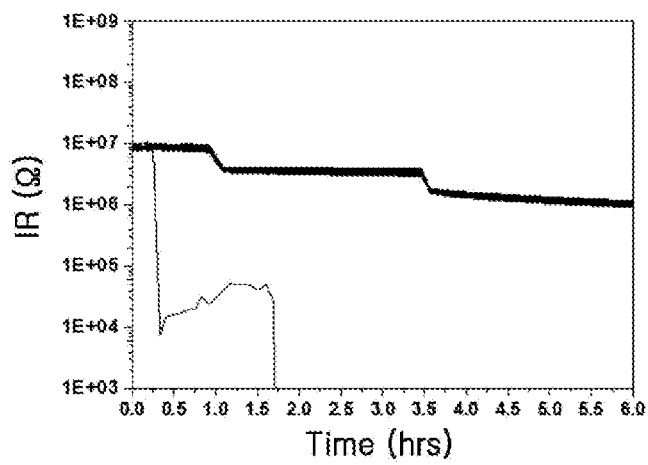
Figure 8A:
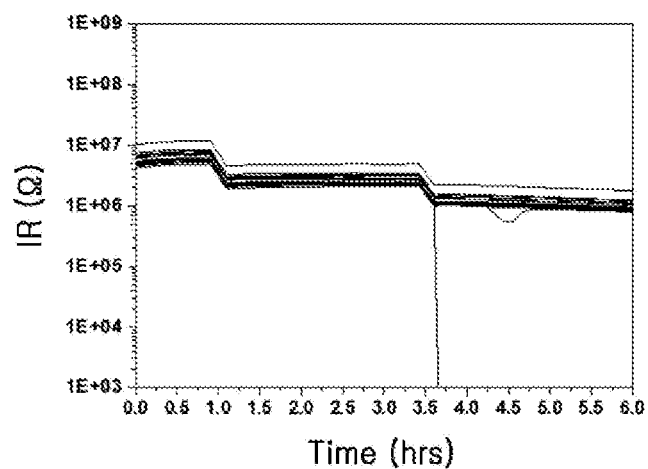
FIGS. 8A to 8C are HALT graphs of test examples.
Figure 8B:
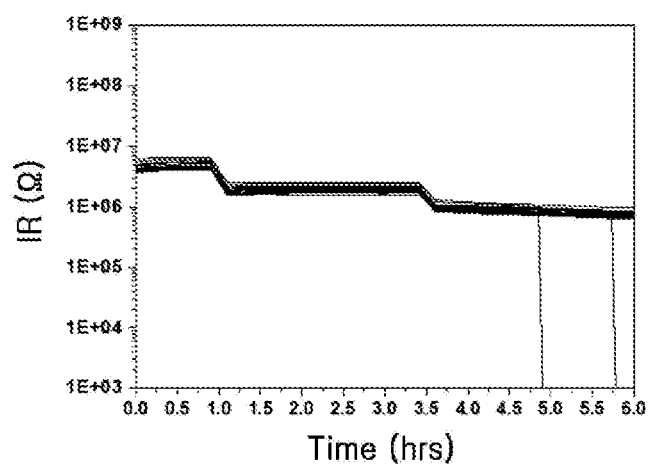
Figure 8C:
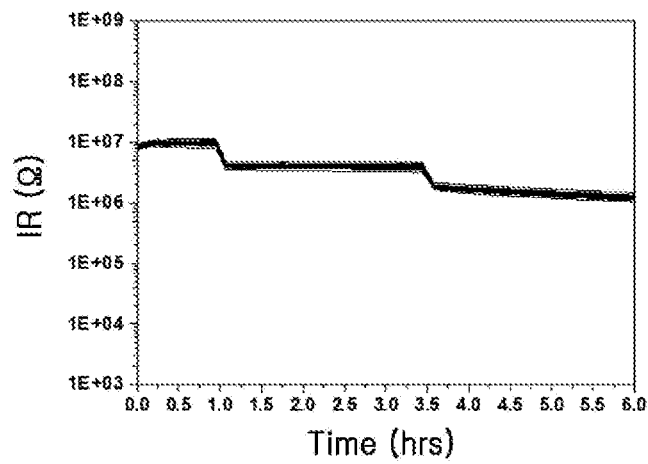
Figure 9A:
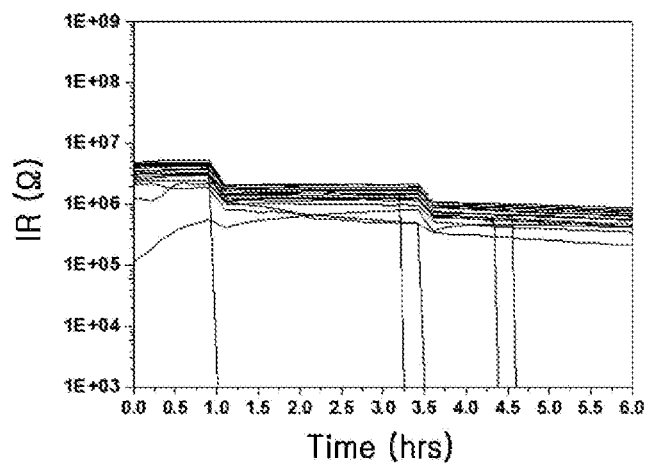
Figure 9B:
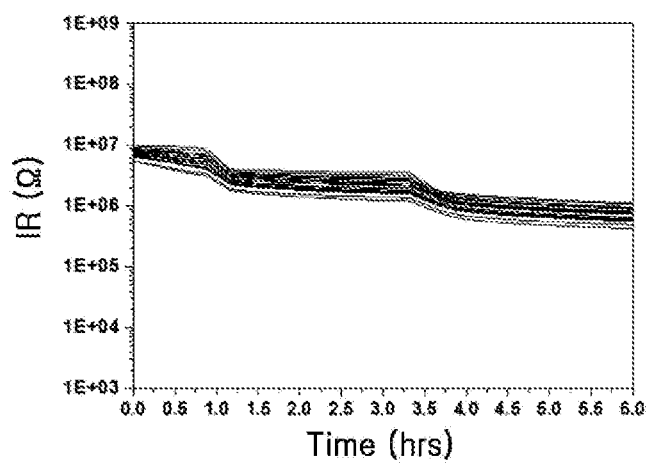
Figure 9C:
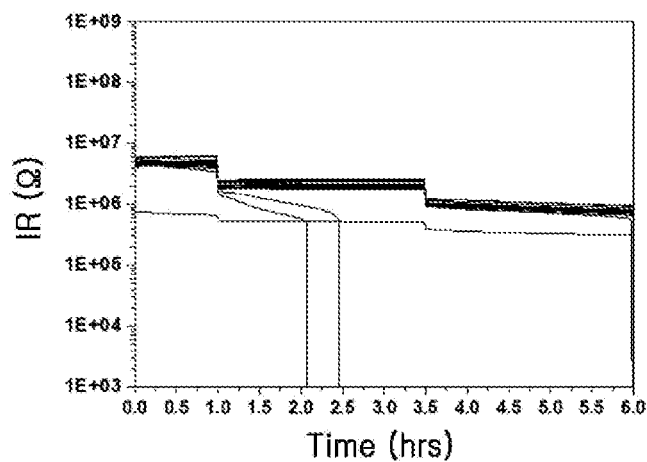

More specifically, FIG. 7Aa is a HALT graph of test example 1, FIG. 7Bb is a HALT graph test example 2, and FIG. 7C is a HALT graph of test example 3. FIG. 8A is a HALT graph of test example 4, FIG. 8B is a HALT graph of test example 5, and FIG. 8C is a HALT graph of test example 6. FIG. 9A is a HALT graph of test example 7, FIG. 9B is a HALT graph of test example 8, and FIG. 9C is a HALT graph of test example 9.

Figure 10A:
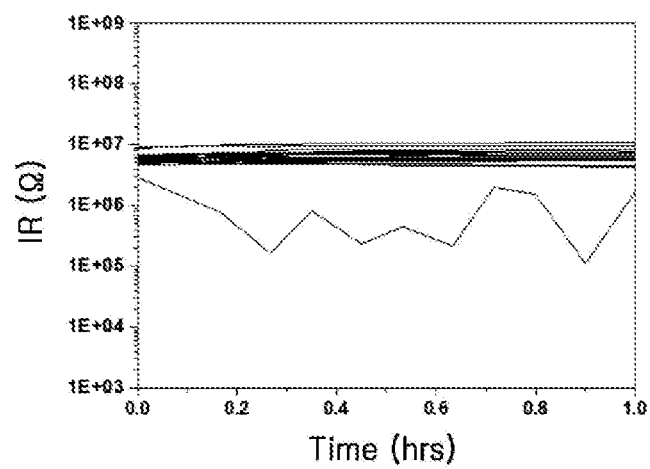
FIGS. 10A to 10C are moisture resistance test graphs of test examples.
Figure 10B:
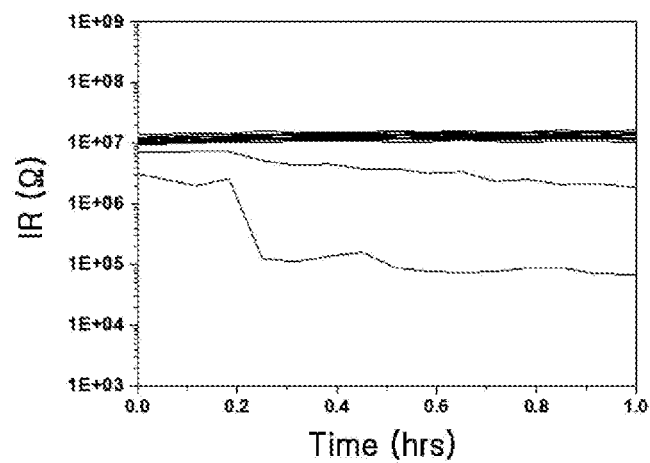
Figure 10C:
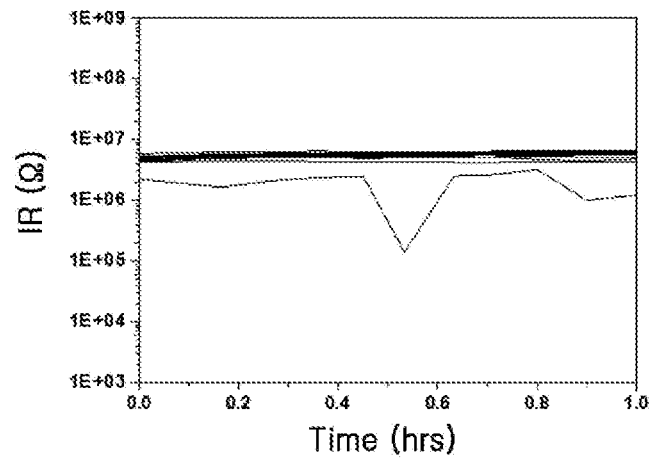
Figure 11A:
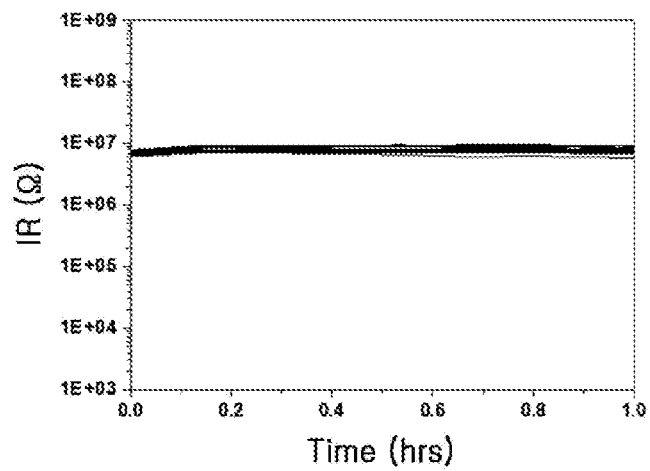
FIGS. 11A to 11C are moisture resistance test graphs of test examples.
Figure 11B:
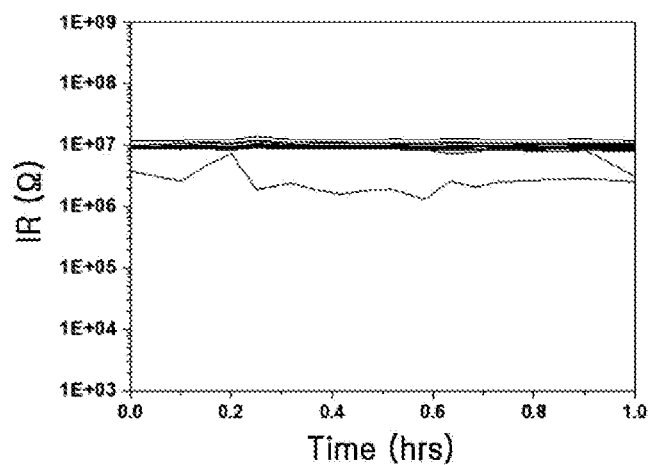
Figure 11C:
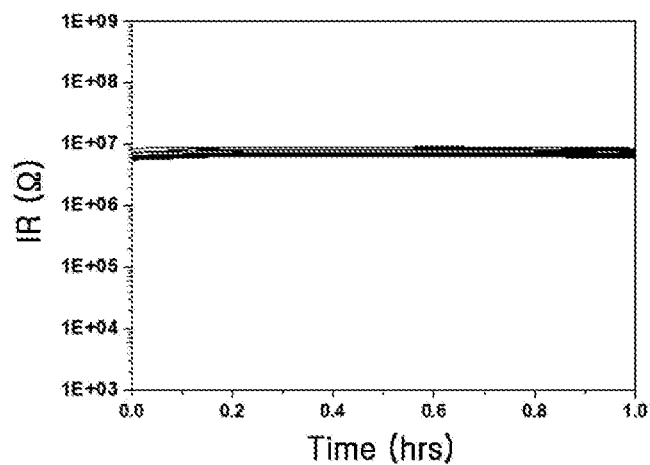
Figure 12A:
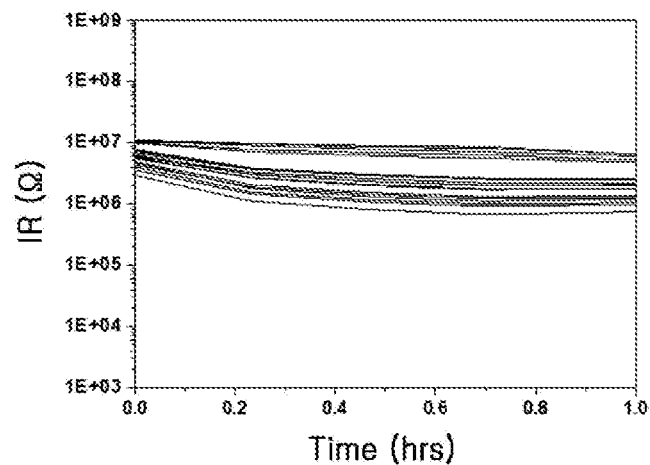
FIGS. 12A to 12C are moisture resistance test graphs of test examples.
Figure 12B:
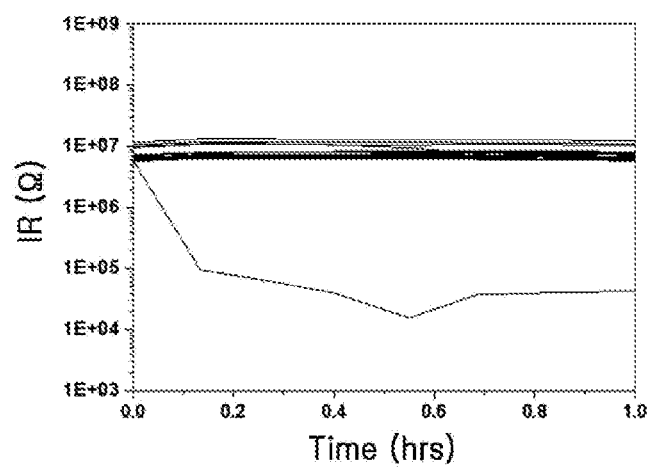
Figure 12C:
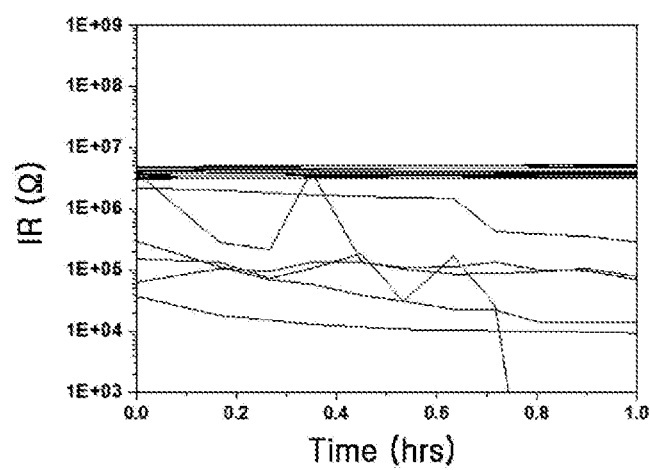

FIG. 10A is a moisture resistance reliability graph of test example 1, FIG. 10B is a moisture resistance reliability graph of test example 2, FIG. 10C is a moisture resistance reliability graph of test example 3. FIG. 11A is a moisture resistance reliability graph of test example 4, FIG. 11B is a moisture resistance reliability graph of test example 5, FIG. 11C is a moisture resistance reliability graph of test example 6. FIG. 12A is a moisture resistance reliability graph of test example 7, FIG. 12B is a moisture resistance reliability graph of test example 8, and FIG. 12C is a moisture resistance reliability graph of test example 9.

FIGS. 7A to 9C are graphs of highly accelerated life test (HALT) performed on test example 1 to test example 9.

The ultra-accelerated life test (HALT) was conducted in three stages, and was performed for 1 hour at a temperature condition of 85° C. and a voltage condition of 6.3 V, was performed for 2 hours at a temperature condition of 105° C. and a voltage condition of 7.56 V. 200 sample chips were tested for each test example, and the sample in which insulation resistance (IR) value fell below $10^5 \Omega$ or a short circuit occurred was considered defective.

FIGS. 10A to 12C are graphs of a moisture resistance reliability test performed on test example 1 to test example 9.

The moisture resistance reliability test was conducted for 48 hours at 85° C., 85% relative humidity, and 6.3V conditions. 200 sample groups were tested for each test example, and the sample in which the insulation resistance (IR) value fell below $10^5\Omega$ or a short circuit occurred was considered as defective.

In the case of the moisture resistance reliability test, when there is even one sample chip considered defective, the sample was indicated as degraded, but when the number of sample chips considered exceeded 3, the target properties was not deemed to be satisfied.

TABLE 1

| Test example | Ba/Ti | Mg (mol) | Sn (mol) | Size of dielectric grain (nm) | Porosity (%) |
|---|---|---|---|---|---|
| 1 | 1.025 | 0 | 0 | 188 ± 90 | 1.11 |
| 2 | 1.030 | 0 | 0 | 172 ± 96 | 1.21 |
| 3 | 1.030 | 1.0 | 0 | 175 ± 88 | 1.14 |
| 4 | 1.030 | 1.5 | 0 | 171 ± 97 | 1.11 |
| 5 | 1.030 | 1.5 | 1.0 | 178 ± 88 | 1.12 |
| 6 | 1.030 | 1.5 | 3.0 | 173 ± 91 | 1.11 |
| 7 | 1.030 | 1.5 | 5.0 | 175 ± 102 | 1.12 |
| 8 | 1.030 | 2.0 | 3.0 | 178 ± 98 | 1.10 |
| 9 | 1.035 | 0 | 0 | 167 ± 83 | 1.32 |

The Ba/Ti molar ratio in the side margin portion of test example 1 was 1.025, the Mg content in the side margin portion was 0 mole based on 100 moles of Ti, and the Sn content in the side margin portion was 0 mole. The average size of the dielectric grains of the boundary surface portion was 188 nm, the standard deviation for the size was 90 nm, and the porosity was 1.11%.

The Ba/Ti molar ratio in the side margin portion of test example 2 was 1.030, the Mg content in the side margin portion was 0 mol based on 100 moles of Ti, and the Sn content in the side margin portion was 0 mole. The average size of the dielectric grains in the boundary surface portion was 172 nm, the standard deviation for the size was 96 nm, and the porosity was 1.12%.

As the Ba/Ti ratio increased as compared to test example 1, the porosity exhibited an improved value of 0.1%, and when referring to the moisture resistance test graph, it may be indicated that the moisture resistance reliability properties were degraded.

The Ba/Ti molar ratio in the side margin portion of test example 3 was 1.035, the Mg content in the side margin portion was 1.0 mole based on Ti 100 moles, and the Sn content in the side margin portion was 0 mole. The average size of the dielectric grains in the boundary surface portion was 175 nm, the standard deviation for the size was 88 nm, and the porosity was 1.14%.

It was confirmed that the moisture resistance reliability was improved as compared to test example 2 as 1.0 mol of Mg was added, but sample chips assessed as defects were present.

The Ba/Ti molar ratio in the side margin portion of test example 4 was 1.030, the Mg content in the side margin portion was 1.5 moles based on 100 moles of Ti, and the Sn content in the side margin portion was 0 mole. The average size of the dielectric grains of the boundary surface portion was 171 nm, the standard deviation for the size was 97 nm, and the porosity was 1.11%.

As 1.5 moles of Mg is added, there was no sample chip assessed as defective in the moisture resistance reliability test, indicating that the moisture resistance reliability was improved.

The Ba/Ti molar ratio in the side margin portion of test example 5 was 1.030, the Mg content in the side margin portion was 1.5 moles based on 100 moles of Ti, and the Sn content in the side margin portion was 1.0 mole. The average size of the dielectric grains in the boundary surface portion was 178 nm, the standard deviation for the size was 88 nm, and the porosity was 1.12%.

As 1.5 moles of Mg was added, the moisture resistance reliability was improved, and as 1.0 mole of Sn was added, a sample chip assessed as defective was present only in the third stage harsh condition in the HALT test, indicating that the high temperature properties was improved.

The Ba/Ti molar ratio in the side margin portion of test example 6 was 1.030, the Mg content in the side margin portion was 1.5 moles based on 100 moles of Ti, and the Sn content in the side margin portion was 3.0 moles. The average size of the dielectric grains of the boundary surface portion was 173 nm, the standard deviation for the size was 91 nm, and the porosity was 1.11%.

As 1.5 moles of Mg was added, the moisture resistance reliability was improved, and as 3.0 mol of Sn was added, no sample chips assessed as defective was present in the HALT test, indicating that the high-temperature properties was the most excellent.

The Ba/Ti molar ratio in the side margin portion of test example 7 was 1.030, the Mg content in the side margin portion was 1.5 moles based on 100 moles of Ti, and the Sn content in the side margin portion was 5.0 moles. The average size of the dielectric grains in the boundary surface portion was 175 nm, the standard deviation for the size was 102 nm, and the porosity was 1.12%.

As 1.5 moles of Mg is added, the moisture resistance reliability test may be considered excellent although there was dispersion. However, as Sn was added excessively, 5.0 moles, a large number of sample chips assessed as defective in the HALT test were observed, and referring to the high standard deviation of the dielectric grain size, it is indicated that the solid solution dispersion properties of the additive was not good.

The Ba/Ti molar ratio in the side margin portion of test example 8 was 1.030, the Mg content in the side margin portion was 2.0 moles based on Ti 100 moles, and the Sn content in the side margin portion was 3.0 moles. The average size of the dielectric grains of the boundary surface portion was 178 nm, the standard deviation for the size was 102 nm, and the porosity was 1.10%.

As 2.0 moles of Mg was added, it may be indicated that the sample chip assessed as defective was present in the moisture resistance reliability test. As 3.0 moles of Sn was added, no sample chips assessed as defective was present in the HALT test, and accordingly, it may be indicated that the high-temperature properties were excellent.

The Ba/Ti molar ratio in the side margin portion of test example 9 was 1.035, the Mg content in the side margin portion was 0 mole based on 100 moles of Ti, and the Sn content in the side margin portion was 0 mole. The average size of the dielectric grains in the boundary surface portion was 167 nm, the standard deviation for the size was 83 nm, and the porosity was 1.32%.

It may be confirmed that the porosity increased as the Ba/Ti ratio increased, and that the moisture resistance reliability and HALT test were not good as Mg and Sn were not added.

To sum up, porosity was improved when the Ba/Ti ratio was greater than 1.025 and less than 1.035, and moisture resistance reliability was the most excellent when Mg was added in an amount greater than 1.0 mole and less than 2.0 moles based on 100 moles of Ti, and when Sn was added in an amount of less than 5.0 moles based on 100 moles of Ti, the high temperature properties was excellent.

According to the aforementioned example embodiments, moisture resistance reliability of a multilayer electronic component may improve.

Also, high-temperature and high-pressure reliability of a multilayer electronic component may improve.

While the example embodiments have been illustrated and described above, it will be configured as apparent to those skilled in the art that modifications and variations could be made without departing from the scope of the present disclosure as defined by the appended claims.

What is claimed is:

1. A multilayer electronic component, comprising:
a body including a capacitance forming portion including a dielectric layer and internal electrodes alternately disposed with the dielectric layer in a first direction, and first and second surfaces of the body opposing each other in the first direction, third and fourth surfaces of the body connected to the first and second surfaces and opposing each other in a second direction, and fifth and sixth surfaces of the body connected to the first to fourth surfaces and opposing each other in a third direction;
external electrodes disposed on the third and fourth surfaces of the body, respectively; and
side margin portions disposed on the fifth and sixth surfaces of the body, respectively,
wherein a Ba/Ti molar ratio of the side margin portion satisfies greater than 1.025 and less than 1.035, and is higher than a Ba/Ti molar ratio of the capacitance forming portion,
wherein a number of moles of Mg based on 100 moles of Ti included in the side margin portion is greater than 1.0 mole and less than 2.0 moles,
wherein a number of moles of Sn based on 100 moles of Ti included in the side margin portion is 0.01 moles or more and less than 5.0 moles, and
wherein a size standard deviation of the average size of dielectric grains included in the boundary surface portion is 100 nm or less.

2. The multilayer electronic component of claim 1, wherein the Ba/Ti molar ratio of the side margin portion is 1.028 or more and 1.032 or less.

3. The multilayer electronic component of claim 1, wherein the number of moles of Mg based on 100 moles of Ti included in the side margin portion is 1.3 moles or more and 1.7 moles or less.

4. The multilayer electronic component of claim 1, wherein the number of moles of Sn based on 100 moles of Ti included in the side margin portion is greater than 1.0 mole.

5. The multilayer electronic component of claim 4, wherein the number of moles of Sn based on 100 moles of Ti included in the side margin portion is 2.5 moles or more and 3.5 moles or less.

6. The multilayer electronic component of claim 1, wherein, in the side margin portion, an average size of dielectric grains included in a boundary surface portion adjacent to the capacitance forming portion is 160 nm or more and 180 nm or less.

7. The multilayer electronic component of claim 6, wherein the average size of dielectric grains included in the boundary surface portion is smaller than an average size of dielectric grains included in the capacitance forming portion.

8. The multilayer electronic component of claim 1, wherein, in the side margin portion, porosity of a boundary surface portion, which is a region adjacent to the capacitance forming portion, is greater than 0.01% and less than 1.30%.

9. The multilayer electronic component of claim 1, wherein the number of moles of Mg based on 100 moles of Ti included in the side margin portion is higher than a number of moles of Mg based on 100 moles of Ti included in the capacitance forming portion.

10. The multilayer electronic component of claim 1, wherein the number of moles of Sn to 100 moles of Ti included in the side margin portion is higher than a number of moles of Sn based on 100 moles of Ti included in the capacitance forming portion.

11. The multilayer electronic component of claim 1, wherein the body includes a plurality of the dielectric layers, and an average size of at least one of the plurality of dielectric layers in the first direction is 0.4 μm or less.

12. The multilayer electronic component of claim 1, wherein an average size of at least one of the plurality of internal electrodes in the first direction is 0.4 μm or less.

13. The multilayer electronic component of claim 1, wherein an average size of the side margin portion in the third direction is 20 μm or less.

14. The multilayer electronic component of claim 1, wherein a size of the multilayer electronic component is 1005 (length×width: 1.0 mm×0.5 mm) or less.

* * * * *